(12) United States Patent  (10) Patent No.: US 8,282,700 B2
Walz et al.  (45) Date of Patent: Oct. 9, 2012

(54) FILTER DEVICE FOR FILTRATION OF A FLUID

(75) Inventors: Stefan Walz, Freiberg a. N. (DE);
 Juergen Kosicki, Erligheim (DE);
 Joachim Streich, Asperg (DE); Markus Hanselmann, Lauffen a. N. (DE);
 Thomas Jessberger, Asperg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 328 days.

(21) Appl. No.: 12/697,709

(22) Filed: Feb. 1, 2010

(65) Prior Publication Data

US 2010/0192777 A1  Aug. 5, 2010

(30) Foreign Application Priority Data

Feb. 2, 2009 (DE) ...................... 20 2009 001 239 U

(51) Int. Cl.
 *B01D 46/00* (2006.01)
(52) U.S. Cl. .............. 55/503; 55/498; 55/502; 210/445; 210/448; 210/452
(58) Field of Classification Search ............. 55/498, 55/502, 503; 96/423; 210/446, 448, 451, 210/452, 497.01, 445
 See application file for complete search history.

(56) References Cited

U.S. PATENT DOCUMENTS
 5,292,432 A * 3/1994 Jainek et al. .............. 210/232

FOREIGN PATENT DOCUMENTS
 DE 202007003356 7/2008
 DE 60133116 3/2009
 EP 1661614 5/2006

OTHER PUBLICATIONS
 German search report DE 20 2009 001 239.5.
 * cited by examiner

*Primary Examiner* — Robert Clemente
 (74) *Attorney, Agent, or Firm* — James Hasselbeck

(57) ABSTRACT

A filter device has a filter housing of connected housing parts with an inlet for unfiltered fluid and an outlet for filtered fluid. A filter element arranged in the filter housing separates the inlet seal-tightly from the outlet. A releasable anchoring device connects the housing parts. The anchoring device has a rotary insert having a guide and anchoring section and an interacting receptacle with an insertion/removal section. The rotary insert of the first housing part is arranged in the receptacle of the second housing part. The guide and anchoring section has a first rotary state in which it is positively guided for gliding in the insertion/removal section to guide the housing parts when being connected or separated. In a second rotary state the guiding and anchoring section is secured in an anchoring section of the receptacle for securing the housing parts. The insertion/removal section passes into the anchoring section.

14 Claims, 4 Drawing Sheets

FILTER DEVICE FOR FILTRATION OF A FLUID

CROSS REFERENCE TO RELATED APPLICATIONS

Priority is claimed based on Federal Republic of Germany patent application no. DE 20 2009 001 239.5 filed Feb. 2, 2009.

TECHNICAL FIELD

The invention concerns a filter device for filtering a fluid, particularly combustion air of an internal combustion engine.

BACKGROUND OF THE INVENTION

WO 2008/043611 A1 discloses a filter device, in particular for filtration of combustion air of internal combustion engines, in which a hose-shaped filter element is arranged in a filter housing. The wall of the filter element separates the raw side (unfiltered side) and the clean side (filtered side) of the filter device in the radial direction. The hose-shaped filter element is secured on a support member. The support member is insertable between a raw fluid (unfiltered fluid) pipe and a clean fluid (filtered fluid) pipe that are assembled to a continuous flow pipe. Adjacent to the axial end faces of the support member, the wall of the support member is provided with several locking recesses that are distributed about the circumference. The locking recesses serve for anchoring the support member between the fluid pipes in a fixed but releasable way. On the outer wall of the fluid pipes several locking noses are formed for this purpose and engage lockingly in the corresponding locking recesses of the support member so that the fluid pipes and the support member are locked on one another in the axial direction.

The filtration of combustion air is very important with respect to proper functioning of an internal combustion engine as well as auxiliary devices of the internal combustion engine, for example, a compressor. Leakage flows that bypass the filter element must therefore be prevented. This requires, on the one hand, a safe and fixed seat of the filter element in the flow path of the combustion air and, on the other hand, the filter element must be exchangeable in a simple way for regular servicing. Moreover, faulty assembly and/or installation of an unsuitable filter element must be precluded in order to prevent damage of the filter device during assembly or damage to another device to which the fluid is supplied that possibly has been filtered unsatisfactorily.

There remains a need in the art for a filter device including simple constructive measures that safely prevent leakage flow bypassing the filter element and, at the same time, enables easy exchangeability of the filter element while preventing incorrect or faulty assembly or even the installation of a wrong or incompatible filter element.

SUMMARY OF THE INVENTION

The invention concerns a filter device for filtering a fluid, particularly combustion air of an internal combustion engine, comprising a filter housing assembled of at least two housing parts wherein the filter housing has an inlet for fluid to be filtered and an outlet for the filtered fluid and further comprising a filter element that is arranged in the filter housing in such a way that the inlet is seal-tightly separated from the outlet and further comprising a releasable anchoring device for connecting the two housing parts.

It is an object of the present invention to provide with simple constructive measures a filter device that safely prevents leakage flows bypassing the filter element and, at the same time, is characterized by easy exchangeability of the filter element and that prevents incorrect or faulty assembly or the installation of a wrong or incompatible filter element.

In accordance with the present invention, this is achieved in that the anchoring device has a rotary insert with a guiding and anchoring section that is rotatably connected with a first one of the housing parts and a receptacle that interacts with the guide and anchoring section in a positive-locking way and is connected to the second housing part. The guide and anchoring section in a first rotary state is moveable in an insertion/removal section of the receptacle so as to provide a positive guiding action during connection or separation of the two housing parts and in a second rotary state is secured positive-lockingly in an anchoring section of the receptacle for anchoring the two housing parts, wherein the insertion/removal section passes into the anchoring section.

The filter device according to the invention is suitable in particular for filtration of combustion air of internal combustion engines but, moreover, generally also is suitable for filtration of gases and optionally also liquid fluids. According to the invention, the housing parts are releasably anchored to one another by means of the anchoring device in the mounted position in order to be able to open as needed the assembly and to easily exchange the filter element. The anchoring device acts upon assembly of the housing parts first as a means for defining the mounting position of the housing parts relative to one another so that the two housing parts will not be assembled with one another in a wrong orientation. When combining the housing parts to assume the insertion position, the anchoring device acts as a guide to prevent relative rotation and/or canting and prevents in this way that gaps between the two housing parts or the filter element will be formed which later on could cause leakage flows. The guiding action of the anchoring device facilitates thus the assembly of the housing parts and of the filter element and ensures moreover correct mounting. In the end position, the anchoring device can be simply locked by rotation of the rotary insert and serves then for anchoring the housing parts on one another. In this way, an accidental separation or rotation or displacement of the two housing parts relative to one another can be prevented and the operational safety of the filter device is increased. The anchoring device is easily releasable by rotation of the rotary insert. An improper seat of the two housing parts, for example, caused by vibrations or improper assembly, is therefore practically prevented or precluded. Moreover, the rotary insert and the receptacle interact with one another in accordance with a lock-and-key system so that mounting of a wrong filter element is precluded.

In an advantageous embodiment, the guiding and anchoring section in the receptacle can be rotated only when it is within the anchoring section from the first rotary state into the second rotary state and in reverse from the second rotary state into the first rotary state. In this way, the mounting position of the two housing parts is fixedly predetermined by the rotary insert and the anchoring section because only within the receptacle a locking action by rotation of the rotary insert is possible.

In a further advantageous embodiment, one of the at least two housing parts can be at least partially inserted into the other housing part, respectively, and the receptacle can be arranged in the wall of the insertable housing part and the rotary insert can be arranged in a wall of the other housing part so as to be actuated from the exterior. Upon pushing the interior housing part into the exterior housing part, the guide and anchoring section of the rotary insert can be guided in the first rotary state within the receptacle and in the mounted position can be rotated simply into the second rotary state by access from the exterior for anchoring the housing parts relative to one another. Between the walls of the housing parts an additional sealing ring may be expediently arranged in order to safely preclude leakage flows.

Advantageously, the guide and anchoring section of the rotary insert can have an elongate straight stay that is rotatable upon rotation of the rotary insert about a transverse axis that extends centrally relative to a longitudinal direction of the stay; the insertion/removal section of the receptacle can have a straight slot in which the stay in the first rotary position a slidable in the longitudinal direction of the stay wherein two oppositely positioned longitudinal sides of the stay can glide positively guided along corresponding edges of the slot; and the anchoring section of the receptacle can have a rotation-symmetrical opening in which the stay, when the axis of the opening and the axis of the central transverse axis of the stay coincide is rotatable about its central transverse axis wherein at least parts of the transverse ends of the stay can glide positively along the edge of the opening. Stays, slots, and openings can be embodied of various materials in a simple way by shaping or cutting or drilling. This stay can interact with the slot as well as with the opening optimally in a positive-locking and reliable way.

Moreover, the filter element may be expediently of a hose-shaped configuration. It may be comprised, for example, of soft, yielding, nonwoven-like filter material that is comprised of synthetic basic materials, particularly on the basis of polymers, but also of natural materials, particularly on the basis of cellulose. As an alternative to a soft material, a stiff material or a stiff embodiment can be envisioned also wherein packaging of folds of the filter element is precluded.

In a further advantageous embodiment the filter element can be insertable between an insertion pipe and a fluid pipe that are combinable to a continuous flow pipe wherein the filter element may be located in the interior of the flow pipe and the insertion pipe can have one of the components of the anchoring device and the fluid pipe can have the mating component of the anchoring device. In this way, a space-saving arrangement of the filter element in a flow pipe is enabled without a separate filter housing being required. In particular, the insertion pipe can be inserted into the fluid pipe or vice versa.

The filter element advantageously can be secured on the insertion pipe; the insertion pipe is insertable between a raw (unfiltered) fluid pipe and the clean (filtered) fluid pipe of filter fluid and is anchored to at least one of the two pipes, wherein the insertion pipe can be provided with one component of the respective anchoring device and the raw fluid pipe and/or the clean fluid pipe can be provided with the corresponding or matching component of the anchoring device, respectively. This has the advantage that, on the one hand, the filter element can be easily exchanged because the filter element and the insertion pipe form an exchangeable module that in particular for servicing purpose can be removed from the pipe assembly and can be inserted again after servicing or exchange of the filter element. Moreover, the risk of leakage flows is eliminated because the insertion pipe has a fixedly determined seal-tight seat between the fluid pipes and, on the other hand, the filter element is connected fixedly with the insertion pipe.

A further advantageous embodiment provides a locking device and/or a stop device for determining the second rotary state of the guide and anchoring section. In this way, a defined stop and locking action for the rotary insert can be realized. The defined stop cannot be overcome and ensures that the rotary insert is mounted in the correct rotary position for the locking action. In this way, the mounting safety is increased. The locking action prevents moreover that the rotary insert during operation of the filter device, particularly as a result of vibrations and/or temperature change, can rotate accidentally and cause the locking action to be released.

Moreover, the locking device can be designed advantageously such that upon transfer from the first rotary state into the second rotary state a tactile and/or acoustic signal is generated. A tactile signal can be in the form of increased force expenditure upon rotation of the rotary insert for overcoming the locking action. Alternatively or additionally to the tactile signal, overcoming the locking action can also be accompanied by a clicking noise.

In a further advantageous embodiment, a sealing device, in particular a sealing ring, can be arranged in a connecting area of the two housing parts that separates the interior of the filter housing seal-tightly from the environment. In this way, it is prevented that infiltrated air from the surroundings can pass through the connecting area into the interior of the filter housing to the clean air side or the raw air side.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
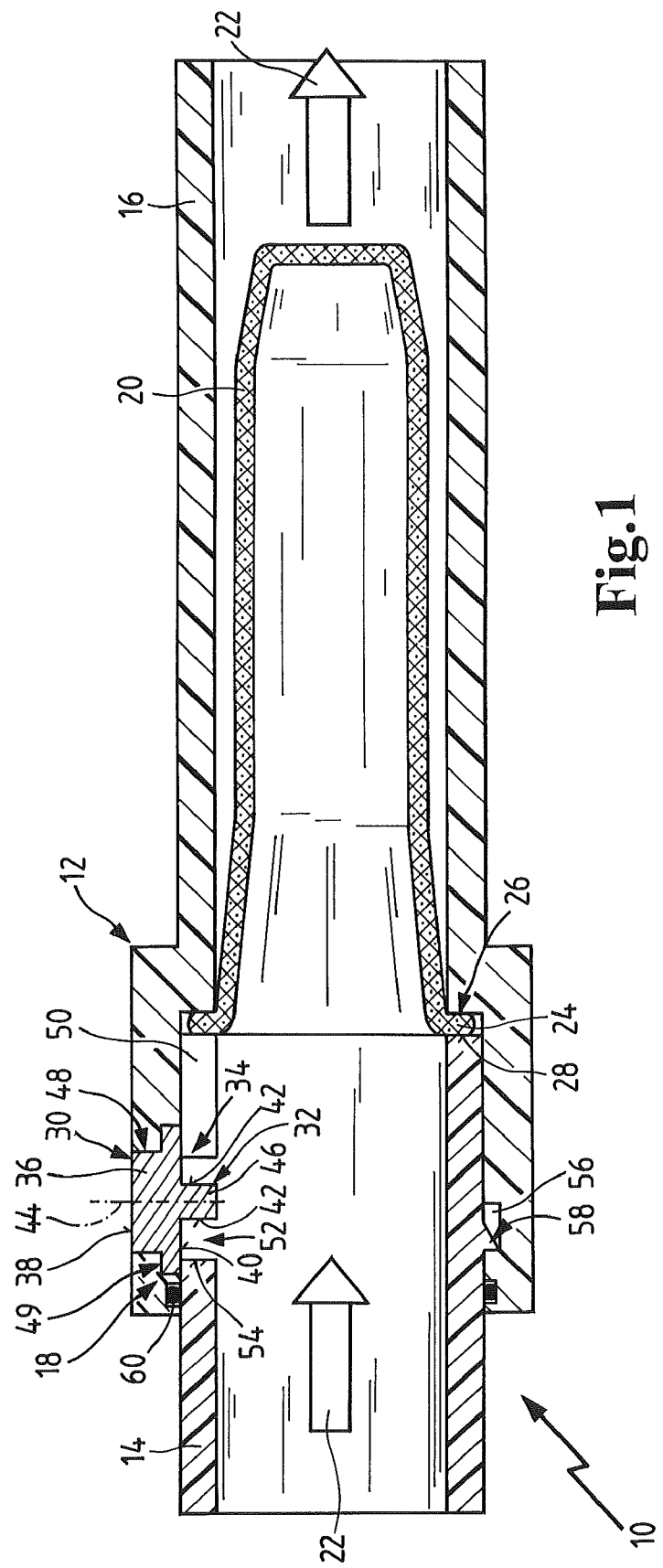
FIG. 1 schematically depicts in longitudinal section a filter device with an insertion pipe and a clean fluid pipe as well as a hose-shaped filter element inserted between insertion pipe and clean fluid pipe, all anchored with one another by means of an anchoring device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a filter device as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1 a filter device identified as a whole by reference numeral 10 is illustrated that is used for filtering a fluid, in particular combustion air of an internal combustion engine.

The filter device 10 comprises a filter housing 12 in the form of a continuous flow pipe that is assembled of an insertion pipe 14 and a clean fluid pipe 16. The insertion pipe 14 is inserted with an end section into a sleeve-shaped stepped end section of the clean fluid pipe 16 and detachably anchored in the clean fluid pipe 16 with an anchoring device identified as a whole at 18. The end section of the clean fluid pipe 16 surrounds the axial end face section of the insertion pipe 14. The insertion pipe 14 forms an inlet for the fluid to be filtered and the clean fluid pipe 16 forms an outlet for the filtered fluid.

A hose-shaped filter element 20 of soft, yielding material is safely and optionally also detachably secured in the insertion pipe 14. The filter element 20 and the insertion pipe 14 belong together and form a unit that is pre-manufactured away from the site of use and installed as a conjoint filter module. The flow direction of the fluid to be cleaned is realized in axial direction in accordance with the shown arrows 22. The flow direction can also be in the opposite direction, i.e., opposite to the illustrated arrows 22 so that the wall of the hose-shaped filter element 20 is flown through from the exterior to the interior.

The filter element 20 is inserted in the interior of the filter housing 12 between the insertion pipe 14 and the clean fluid pipe 16 such that the inlet of the filter housing 12 is separated seal-tightly from the outlet. In the mounted position according to FIG. 1 an end face section 24 of the filter element 20 is fixedly and fluid-tightly clamped between an end face 26 of a radially inwardly positioned step of the stepped end section of the clean fluid pipe 16 and the facing end face 28 of the insertion pipe 14.

Figure 2:
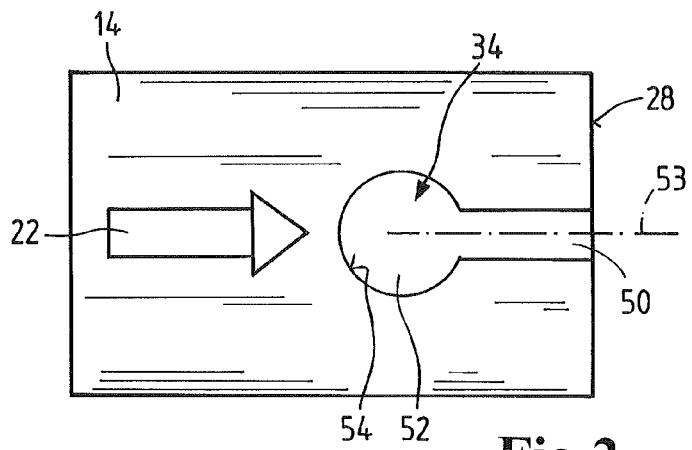
FIG. 2 schematically depicts a detail of the insertion pipe of FIG. 1 with a receptacle for a stay of a rotary insert of the anchoring device.
Figure 3:
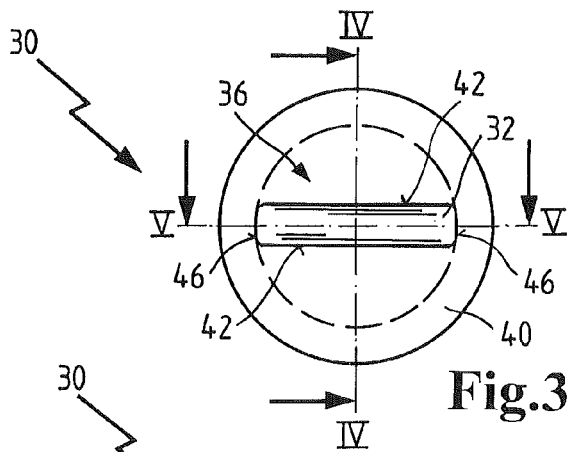
FIG. 3 schematically depicts the rotary insert of the anchoring device of FIG. 1.

The anchoring device 18 has a rotary insert 30 with a guide and anchoring section 32 that is connected rotatably with the clean fluid pipe 16. The rotary insert 30 is shown in detail in FIGS. 3 to 5. Moreover, the anchoring device 18 has on the insertion pipe 14 a receptacle 34 for the guide and anchoring section 32 of the anchoring device 18 that positive-lockingly interacts with the rotary insert 30. The detail of the insertion pipe 14 with the receptacle 34 is illustrated in FIG. 2.

The rotary insert 30 is comprised of a base section 36 and the guide and anchoring section 32. The base section 36, shown in the FIGS. 4 and 5 to the left, has the shape of a flat stepped rotation body whose end faces 38 and 40 have different diameters.

The small end face 38 of the base section 36 is provided with an actuating slot, not illustrated, or any other engagement means that is engaged for rotation of the rotary insert 30 by a tool, for example, a screwdriver. Alternatively it is also possible to provide an engagement means that is suitable for manual actuation without tool.

Figure 4:
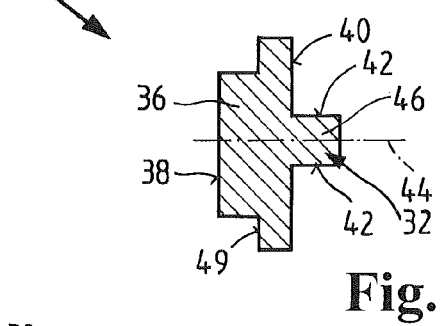
FIG. 4 schematically depicts a section of the rotary insert of FIG. 3 along the section line IV-IV.
Figure 5:
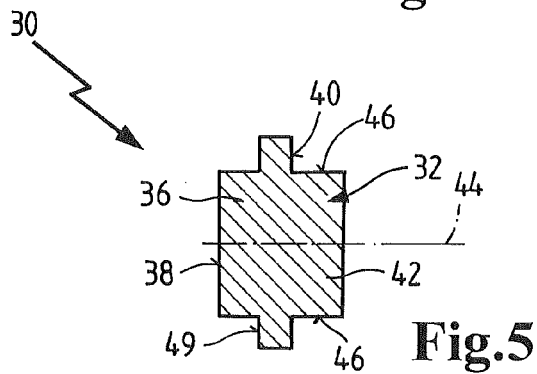
FIG. 5 schematically depicts a section of the rotary insert of FIG. 3 along the section line V-V.

On the large end face 40 of the base section 36 the guide and anchoring section 32 is arranged in the form of an elongate straight substantially parallelepipedal stay. Two longitudinal lateral surfaces 42 of the guide and anchoring section 32 extend on either side of a rotational axis 44 of the base section 36 parallel to and, with their longitudinal extension, perpendicularly to the rotation axis 44 (FIG. 4). Two transverse end faces 46 of the guide and anchoring section 32 extend on either side of the axis of rotation 44 on a circumferential surface of an imaginary circular cylinder whose central axis coincides with the rotation axis 44 of the base section 36 and defines an imaginary central transverse axis of the guide and anchoring section 32, as indicated in FIGS. 1, 4, and 5.

The rotary insert 30 is arranged in a circular through bore 48 in the wall of the clean fluid pipe 16. The bore 48 is stepped in a complementary fashion to the base section 36 of the rotary insert 30. The small end face 38 of the base section 36 is located on the radial outer circumferential side of the clean fluid pipe 16 so that the actuating slot, not illustrated, is accessible from the exterior and the rotary insert 30 is actuatable from the exterior. Upon rotation of the rotary insert 30 in the bore 48 the guide and anchoring section 32 rotates about rotary axis 44, i.e., about its central transverse axis. The exterior contour of the large end face 40 of the base section 36 passes into the outer contour of the radial inner surface of the clean fluid pipe 16 so that the large end face 40 does not impair insertion of the insertion pipe 14. A step 49 of the base section 36 rests against a corresponding step of the bore 48 so that the rotary insert 30 cannot move radially outwardly within the clean fluid pipe 16.

The receptacle 34 for the guide and anchoring section 32 of the rotary insert 30 is located in the wall of the sleeve-shaped end section of the insertion pipe 14. The receptacle 34 has an insertion/removal section 50 and an anchoring area 52 that belong together and pass into one another.

Figure 6:
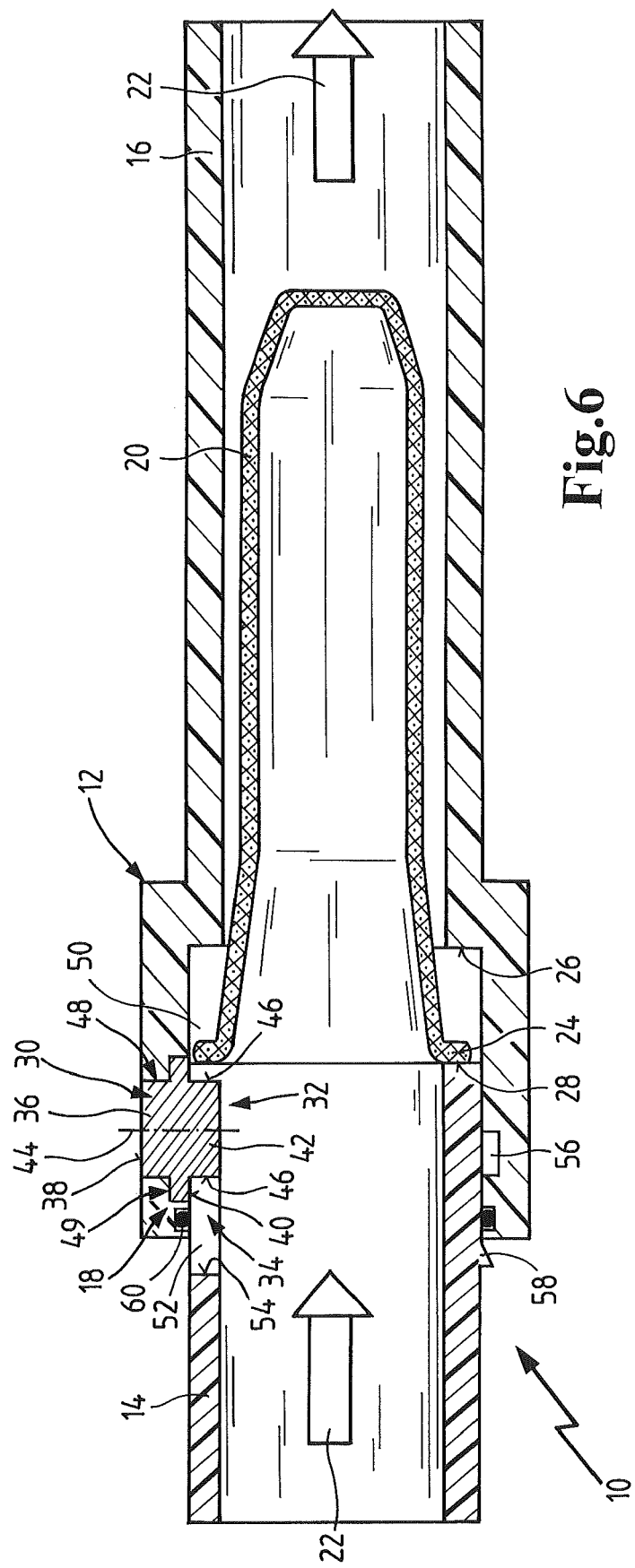
FIG. 6 schematically depicts the filter device of FIG. 1 during assembly of the two fluid pipes, wherein the rotary insert of FIGS. 3 through 5 is shown in a first rotary state.

The insertion/removal section 50 is a straight and continuous slot in the wall of the insertion pipe 14. The insertion/removal section 50 extends in longitudinal direction of the insertion pipe 14 from the end face 28 facing the step of the end section of the clean fluid pipe 16 to the anchoring area 52. The insertion/removal section 50 is open toward the anchoring section 52 and the end face 28 of the insertion pipe 14. The extension of the insertion/removal section 50 in the circumferential direction of the insertion pipe 14 is somewhat greater than the spacing of the longitudinal lateral surfaces 42 of the guide and anchoring section 32 perpendicular to the axis of rotation 44 of the rotary insert 30 and significantly smaller than the spacing of the transverse end faces 46 of the guide and anchoring section 32. In the first rotary state illustrated in FIG. 6 the rotary insert 30 is oriented such that the guide and anchoring section 32 extends parallel to the imaginary longitudinal center axis 53 of the insertion/removal section 50, in the illustrated example axially to the insertion pipe 14. In this way, the guide and anchoring section 32 can be moved within in the insertion/removal section 50 in the longitudinal direction of the guide and anchoring section 32 and provide a guiding action for connecting or separating the insertion pipe 14 and the clean fluid pipe 16. When doing so, the two oppositely position longitudinal lateral surfaces 42 of the guide and anchoring section 32 glide positively along the matching lateral surfaces of the insertion/removal section 50.

The anchoring section 52 of the receptacle 34 is a circular through opening in the wall of the insertion pipe 14. The diameter of the anchoring section 52 is somewhat greater than the extension of the guide and anchoring section 32 in its longitudinal direction. The central axis of the anchoring section 52 crosses the longitudinal center axis 53 of the insertion/removal section 50. In the properly mounted state illustrated in FIG. 1 the center axis of the anchoring section 52 and the rotary axis 44 of the rotary insert 30 coincide so that the guide and anchoring section 32 is rotatable in the anchoring section 52 about the rotary axis 44, i.e., about its central transverse axis. Upon rotation of the guide and anchoring section 32 in the anchoring area 52 the transverse end faces 46 of the guide and anchoring section 32 glide positively along a radially inner circumferential surface 54 of the anchoring section 52. The guide and anchoring section 32 of the rotary insert 30 can be rotated in the anchoring section 52 from the first rotary state into a second rotary state as well as from the second rotary state into the first rotary state.

The second rotary state is shown in FIG. 1. In the second rotary state the rotary insert 30 is oriented such that the longitudinal lateral surfaces 42 of the guide and anchoring section 32 extend perpendicularly to the longitudinal axis 53 of the insertion/removal section 50. In the second rotary state the guide and anchoring section 32 of the rotary insert 30 are positive-lockingly secured in the anchoring section 52 for anchoring the insertion pipe 14 with the clean fluid pipe 16 so that the insertion pipe 14 can neither be moved axially nor tangentially relative to the clean fluid pipe 16.

On the inner circumferential wall of the clean fluid pipe 16 that is opposite the bore 48 for the rotary insert 30 the clean fluid pipe 16 has a locking receptacle 56. On the exterior wall of the insertion pipe 14 a locking nose 58 is formed which in the mounted state (FIG. 1) projects lockingly into the locking recess 56 of the clean fluid pipe 16 so that the clean fluid pipe 16 with the insertion pipe 14 in axial direction is additionally locked. The locking recess 56 and the locking nose 58 together form locking means by means of which on the side that is opposite the anchoring device 18 a detachable additional locking or snap-in connection between the insertion pipe 14 and the clean fluid pipe 16 can be produced. In this way, a force for the locking action can act more uniformly on the pipes 14 and 16 in order to prevent one-sided loads and canting between the pipes 14 and 16.

For a fluid-tight connection and for avoiding infiltrating air flows a sealing ring 60 is arranged between the exterior wall of the insertion pipe 14 and the interior wall of the clean fluid pipe 16. The sealing ring 60 separates the interior of the filter housing 12 seal-tightly from the environment. In this way, it is prevented that raw air (infiltrated air or foreign air) from the environment can pass through the connecting area into the interior of the filter housing 12 when the flow direction should be reversed, i.e., so as to extend opposite to the arrows 22. The bore 48 in the wall of the clean fluid pipe 16 is sealed by means of a further seal, not illustrated in FIGS. 1 to 6, either relative to the rotary insert 30 and/or relative to the insertion pipe 14 so that here also no infiltrated air can be sucked in.

Figure 7:
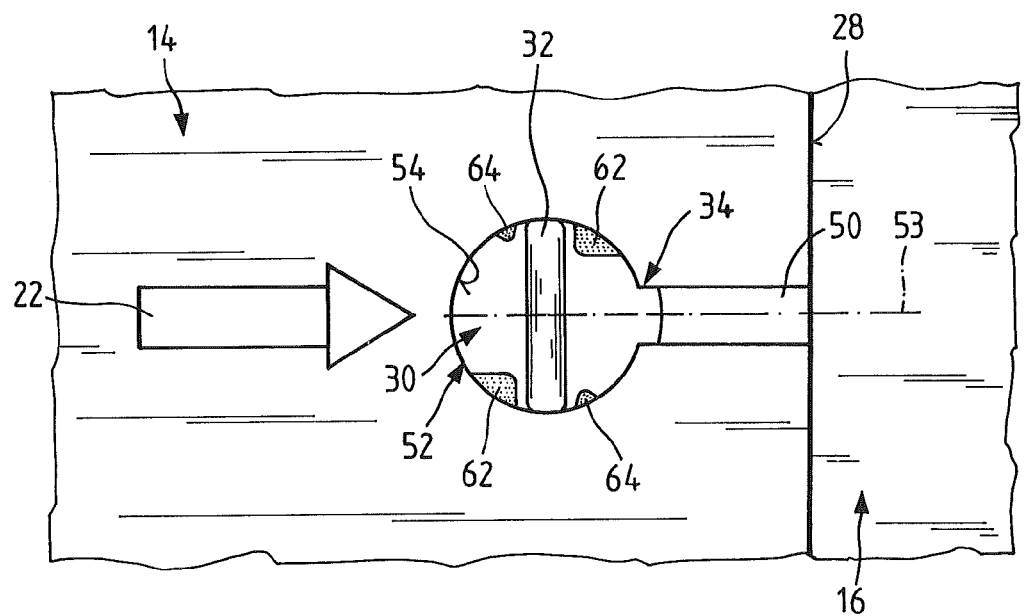
FIG. 7 schematically depicts a detail view of the inner side of an insertion pipe similar to that of FIG. 1 in which the receptacle has end stops and locking noses for the stay of the rotary insert.

In FIG. 7, a detail of a second embodiment of an insertion pipe 14 with a mounted clean fluid pipe 16 is shown. The viewing direction is radial from the interior to the exterior. In the second embodiment, the elements that are similar to those of the first embodiment, illustrated in FIGS. 1 to 6, are provided with the same reference numerals so that with regard to their description reference is being had to the discussion of the first embodiment. The second embodiment differs from the first in that the anchoring section 52 of the receptacle 34 has a locking device and a stop device for the stay 32 of the rotary insert 30 in the form of two locking noses 64 and two end stops 62. The end stops 62 and locking noses 64 are arranged opposite one another on the radial inner circumferential surface 54 of the anchoring section 52 and extend to the center of the receptacle 34, respectively. With regard to their extension in radial direction of the receptacle 34, the locking noses 64 are designed such that upon rotation of the rotary insert 30 they must be overcome with a preferably noticeable force expenditure. Overcoming the locking noses 64 can also be signaled acoustically, for example, by a clicking noise; this contributes to increased mounting safety. The locking noses 64 and/or the stay 32 can also be elastically yielding for this purpose. The extension of the end stops 62 inwardly in radial direction is greater than that of the locking noses 64 so that upon rotation of the rotary insert 30 they cannot be overcome. The end stops 62 and the locking noses 64 are positioned such that in the correct looking position of the rotary insert 30 shown in FIG. 7 the stay 32 at both transverse ends is locked between an end stop 62 and a locking nose 64. In this way, mounting safety is increased. The locking action prevents that the rotary insert 30 during operation of the filter device 10, for example, as a result of vibrations and/or temperature changes, can rotate causing the anchoring device 18 to be released.

In one embodiment, not illustrated, the insertion pipe 14 is provided in the end section facing away from the clean fluid pipe 16 with a further receptacle 34 for a guiding and anchoring section 32 of a rotary insert 30 of a raw fluid pipe. The raw fluid pipe can thus be connected and anchored in analogy to the clean fluid pipe 16 with the insertion pipe 14. The insertion pipe 14 in this way is insertable between the raw fluid pipe and clean fluid pipe 16.

In all of the afore described embodiments of a filter device 10 the following modifications are possible inter alia:

The invention is not limited to the filter device 10 for filtration of combustion air of an internal combustion engine. Instead, it can also be used as a filter device 10 for other, even liquid, fluids, for example fuel, oil or water.

The filter housing 12, instead of being a fluid pipe, can also be embodied in a different way, for example, as a separate housing.

The insertion pipe 14 can also be pushed like a sleeve onto the clean fluid pipe 16 and/or the raw fluid pipe.

Instead of the hose-shaped filter element 20 also a different kind of filter element, for example, a parallelepipedal filter element, can be arranged in a matching two-part housing.

Instead of a modular configuration the insertion pipe 14 and the filter element 20 can also be separate parts that only upon assembly with the clean fluid pipe are connected functionally with one another.

The transverse end faces 46 of the guide and anchoring section 32 can also be straight instead of curved so that only their edges glide positively along the radial inner circumferential surface 54 of the anchoring section 52.

The longitudinal lateral surfaces 42 and/or the transverse end faces 46 of the guide and anchoring section 32 can also be profiled in the direction of the rotary axis 44, in particular, can be coded, and the corresponding lateral surfaces of the insertion/removal section 50 or of the circumferential surface 54 of the anchoring section 52 can be profiled in a complementary way so that, in accordance with the principle of a lock-and-key system, a connection of components that do not match one another cannot be realized.

Instead of the sealing ring 60 also any other sealing device can be used that is arranged in the connecting area of the clean fluid pipe 16 and the insertion pipe 14 and that separates the interior of the filter housing 12 seal-tightly from the surroundings. The sealing device can also be designed such that it seals the area of the bore 48.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter device for filtering a fluid, the filter device comprising:
   a filter housing assembled of housing parts, wherein said filter housing has an inlet for a fluid to be filtered and an outlet for filtered fluid;
   a filter element arranged in said filter housing such that said inlet is separated seal-tightly from said outlet; and
   a releasable anchoring device configured and adapted to connect said housing parts relative to each other;
   wherein said anchoring device comprises
      a rotary insert having a guide and anchoring section; and
      a receptacle interacting positive-lockingly with said guide and anchoring section;
   wherein said rotary insert is connected rotatably with a first one of said housing parts and said receptacle is provided on a second one of said housing parts;
   wherein said receptacle comprises an insertion/removal section;
   wherein said guide and anchoring section has a first rotary state and a second rotary state;
   wherein in said first rotary state said guide and anchoring section is positively guided for gliding in said insertion/removal section of said receptacle for guiding said housing parts relative to one another when being connected or separated;
   wherein said guiding and anchoring section in said second rotary state is secured positive-lockingly in an anchoring section of said receptacle for anchoring said housing parts relative to one another; and
   wherein said insertion/removal section passes into said anchoring section;
   wherein said guide and anchoring section of said rotary insert comprises an elongated straight stay that is rotatable upon rotation of said rotary insert about a central transverse axis that extends transversely relative to said stay and is centrally arranged relative to a longitudinal direction of said stay;
   wherein said insertion/removal section of said receptacle comprises a straight slot in which said stay in said first rotary position is slidable in said longitudinal direction of said stay to enable slidable connecting or uncoupling of said first and second housing parts;
   wherein two opposed longitudinal sides of said stay glide in positive engagement along longitudinal lateral surfaces of said slot;
   wherein said anchoring section of said receptacle has a rotation-symmetrical opening in which said stay, when an axis of said opening and said central transverse axis of said stay coincide, is rotatable about said central transverse axis;
   wherein at least parts of transverse ends of said stay positively glide along a radial inner circumferential surface of said rotation-symmetrical opening.

2. The filter device according to claim 1, wherein said guide and anchoring section is rotatable from said first rotary state into said second rotary state and from said second rotary state into said first rotary state only when in said anchoring section of said receptacle.

3. The filter device according to claim 1, wherein said first and second housing parts are insertable at least partially into one another.

4. The filter device according to claim 1, wherein said second housing part with said receptacle is insertable into said first housing part with said rotary insert;
   wherein said receptacle is provided in a wall of said second housing part; and
   wherein said rotary insert is arranged in a wall of said first housing part and is actuatable from an exterior of said first housing part.

5. The filter device according to claim 1, wherein said filter element is hose-shaped.

6. The filter device according to claim 1, wherein said first housing part is a first fluid pipe and said second housing part is an insertion pipe;
   wherein said filter element is insertable between said insertion pipe and said first fluid pipe;
   wherein said insertion pipe and said fluid first pipe are decoupeably and sealably connected to form a continuous flow pipe; and
   wherein said filter element is located in an interior of said flow pipe.

7. The filter device according to claim 6, wherein said filter element is secured to said insertion pipe to form a unitary assembly;
   wherein said insertion pipe is insertable between said first fluid pipe and a second fluid pipe;
   wherein said first fluid pipe is a raw fluid pipe or a clean fluid pipe; and
   wherein said second fluid pipe is a clean fluid pipe or a raw fluid pipe, respectively.

8. The filter device according to claim 7, comprising a second one of said anchoring devices,
   wherein said insertion pipe is connected by said anchoring devices to said first and second fluid pipes, respectively.

9. The filter device according to claim 1, comprising at least one of a locking device and a stop device for determining said second rotary state of the guide and anchoring section.

10. The filter device according to claim 9, wherein
said locking device is configured such that upon transfer from said first rotary state into said second rotary state a signal is produced.

11. The filter device according to claim 10, wherein
said signal is a tactile signal; an acoustic signal; or a combination of a tactile signal and an acoustic signal.

12. The filter device according to claim 1, comprising
a sealing device arranged in a connecting area of said housing parts
wherein said sealing device seals seal-tightly between an interior of said filter housing and an outside environment.

13. The filter device according to claim 12, wherein said sealing device is a sealing ring.

14. A filter device for filtering a fluid, the filter device, comprising
a filter housing assembled of housing parts, wherein said filter housing has an inlet for a fluid to be filtered and an outlet for filtered fluid;
a filter element arranged in said filter housing such that said inlet is separated seal-tightly from said outlet; and
a releasable anchoring device configured and adapted to connect said housing parts relative to each other;
wherein said anchoring device comprises
a rotary insert having a guide and anchoring section; and
a receptacle interacting positive-lockingly with said guide and anchoring section;
wherein said rotary insert is connected rotatably with a first one of said housing parts and said receptacle is provided on a second one of said housing parts;
wherein said receptacle comprises an insertion/removal section;
wherein said guide and anchoring section has a first rotary state and a second rotary state;
wherein in said first rotary state said guide and anchoring section is positively guided for gliding in said insertion/removal section of said receptacle for guiding said housing parts relative to one another when being connected or separated;
wherein said guiding and anchoring section in said second rotary state is secured positive-lockingly in an anchoring section of said receptacle for anchoring said housing parts relative to one another;
wherein said insertion/removal section passes into said anchoring section;
wherein said first housing part is a first fluid pipe and said second housing part is an insertion pipe;
wherein said filter element is insertable between said insertion pipe and said first fluid pipe;
wherein said insertion pipe and said fluid first pipe are decoupleably and sealably connected to form a continuous flow pipe; and
wherein said filter element is located in an interior of said flow pipe;
wherein said filter element is secured to said insertion pipe to form a unitary assembly;
wherein said insertion pipe is insertable between said first fluid pipe and a second fluid pipe;
wherein said first fluid pipe is a raw fluid pipe or a clean fluid pipe;
wherein said second fluid pipe is a clean fluid pipe or a raw fluid pipe, respectively;
wherein the filter device further comprises a second one of said anchoring devices;
wherein said insertion pipe is connected by said anchoring devices to said first and second fluid pipes, respectively.

* * * * *